(12) United States Patent
Schalk et al.

(10) Patent No.: US 9,224,394 B2
(45) Date of Patent: Dec. 29, 2015

(54) SERVICE ORIENTED SPEECH RECOGNITION FOR IN-VEHICLE AUTOMATED INTERACTION AND IN-VEHICLE USER INTERFACES REQUIRING MINIMAL COGNITIVE DRIVER PROCESSING FOR SAME

(75) Inventors: Thomas Barton Schalk, Plano, TX (US); Leonel Saenz, Carrollton, TX (US); Barry Burch, Dallas, TX (US)

(73) Assignee: Sirius XM Connected Vehicle Services Inc, Irving, TX (US)

( * ) Notice: Subject to any disclaimer, the term of this patent is extended or adjusted under 35 U.S.C. 154(b) by 647 days.

(21) Appl. No.: 12/729,573

(22) Filed: Mar. 23, 2010

(65) Prior Publication Data

US 2010/0250243 A1    Sep. 30, 2010

Related U.S. Application Data

(60) Provisional application No. 61/162,695, filed on Mar. 24, 2009, provisional application No. 61/288,067, filed on Dec. 18, 2009.

(51) Int. Cl.
| | |
|---|---|
| *G10L 15/00* | (2013.01) |
| *G10L 15/26* | (2006.01) |
| *G10L 21/00* | (2013.01) |
| *G10L 25/00* | (2013.01) |
| *G10L 15/22* | (2006.01) |
| *G10L 15/30* | (2013.01) |

(52) U.S. Cl.
CPC .............. *G10L 15/22* (2013.01); *G10L 15/30* (2013.01)

(58) Field of Classification Search
USPC ..................................................... 704/270.1
See application file for complete search history.

(56) References Cited

U.S. PATENT DOCUMENTS

| | | | | |
|---|---|---|---|---|
| 6,789,061 | B1 * | 9/2004 | Fischer et al. | 704/240 |
| 6,834,265 | B2 * | 12/2004 | Balasuriya | 704/270.1 |
| 6,868,385 | B1 | 3/2005 | Gerson | |
| 6,968,311 | B2 * | 11/2005 | Knockeart et al. | 704/270 |
| 7,203,651 | B2 * | 4/2007 | Baruch et al. | 704/270.1 |
| 7,363,228 | B2 * | 4/2008 | Wyss et al. | 704/275 |
| 7,657,433 | B1 * | 2/2010 | Chang | 704/252 |

(Continued)

OTHER PUBLICATIONS

Huang, et al., Spoken Language Processing, A Guide to Theory, Algorithm, and System Development, Prentice-Hall, Inc., (2001) pp. vii-15.

*Primary Examiner* — Olujimi Adesanya
(74) *Attorney, Agent, or Firm* — Mayback & Hoffman, P.A.; Gregory L. Mayback; Rebecca A. Tie

(57) ABSTRACT

A system and method for implementing a server-based speech recognition system for multi-modal automated interaction in a vehicle includes receiving, by a vehicle driver, audio prompts by an on-board human-to-machine interface and a response with speech to complete tasks such as creating and sending text messages, web browsing, navigation, etc. This service-oriented architecture is utilized to call upon specialized speech recognizers in an adaptive fashion. The human-to-machine interface enables completion of a text input task while driving a vehicle in a way that minimizes the frequency of the driver's visual and mechanical interactions with the interface, thereby eliminating unsafe distractions during driving conditions. After the initial prompting, the typing task is followed by a computerized verbalization of the text. Subsequent interface steps can be visual in nature, or involve only sound.

29 Claims, 5 Drawing Sheets

(56) References Cited

U.S. PATENT DOCUMENTS

| | | |
|---|---|---|
| 8,543,401 B2* | 9/2013 | Suendermann et al. ...... 704/243 |
| 2002/0194000 A1* | 12/2002 | Bennett et al. ................ 704/270 |
| 2003/0120486 A1* | 6/2003 | Brittan et al. ................. 704/231 |
| 2004/0128135 A1* | 7/2004 | Anastasakos et al. ...... 704/270.1 |
| 2005/0049785 A1* | 3/2005 | Vergin .......................... 701/209 |
| 2005/0137877 A1* | 6/2005 | Oesterling et al. ............ 704/275 |
| 2005/0222933 A1* | 10/2005 | Wesby ............................ 705/36 |
| 2005/0240404 A1* | 10/2005 | Gurram et al. ................ 704/231 |
| 2006/0129406 A1 | 6/2006 | Mandalia et al. |
| 2007/0136069 A1* | 6/2007 | Veliu et al. .................... 704/270 |
| 2007/0219807 A1* | 9/2007 | Schalk et al. ................. 704/275 |
| 2008/0118051 A1* | 5/2008 | Odinak et al. ........... 379/265.09 |
| 2008/0147410 A1* | 6/2008 | Odinak ...................... 704/270.1 |
| 2008/0154870 A1* | 6/2008 | Evermann et al. ................ 707/4 |
| 2008/0177551 A1 | 7/2008 | Schalk |
| 2009/0204409 A1* | 8/2009 | Mozer et al. .................. 704/275 |
| 2009/0204410 A1* | 8/2009 | Mozer et al. .................. 704/275 |
| 2010/0049516 A1* | 2/2010 | Talwar et al. ................. 704/251 |
| 2010/0312547 A1* | 12/2010 | Van Os et al. ..................... 704/9 |
| 2011/0015928 A1* | 1/2011 | Odell et al. .................. 704/257 |

* cited by examiner

SERVICE ORIENTED SPEECH RECOGNITION FOR IN-VEHICLE AUTOMATED INTERACTION AND IN-VEHICLE USER INTERFACES REQUIRING MINIMAL COGNITIVE DRIVER PROCESSING FOR SAME

CROSS-REFERENCE TO RELATED APPLICATIONS

This application claims the benefit of U.S. Provisional Application Nos. 61/162,695 and 61/288,067, filed on Mar. 24, 2009, and Dec. 18, 2009, respectively, the entire disclosures of which are hereby incorporated herein by reference in their entireties.

FIELD OF THE INVENTION

The present invention relates generally to a system and method for implementing a server-based speech recognition system for multi-modal interaction that may be applied to any interactive automated system, such as an interactive automated system that is being used inside a motor vehicle. More particularly, the present invention pertains to a system and method of utilizing multiple speech recognizers and an associated human-to-machine, in-vehicle interface to create an efficient, safe, reliable, convenient, and enjoyable experience for the motorist under driving conditions while simultaneously achieving high automation rates.

BACKGROUND OF THE INVENTION

A primary objective of the present invention is to provide call center enterprises with highly effective automation to reduce costs without sacrificing the quality of service for the customer. Interactive automation should be a preferred measure of interaction by the customer, or motorist, to achieve tasks that could otherwise be handled through human/agent interaction through a call center. In the present invention, a service oriented architecture (SOA) is utilized to selectively leverage specialized speech recognizers in a uniquely adaptive fashion. The benefits of such an approach are to provide a safe and enjoyable user interface and to improve a call center's efficiency, as described herein.

The advent of telematics services, which were introduced over a decade ago, brought with it a trend to incorporate the ability of a vehicle to communicate with remote data centers and transmit location data and vehicle information related to safety, security, and emergency breakdown. "Telematics," as it is referred to in the art, includes the integration of wireless communications, vehicle monitoring systems and location devices. Such technologies in automotive communications combine wireless voice and data capability for management of information and safety applications.

Most of the early telematics communication was achieved through wireless voice channels that were analog in nature. By law in 2008, all analog connectivity became digital and, consequently, data connectivity, such as "3G" technology, became a readily available measure for mobile devices to "connect" to the Internet. As a result of these advances, the vehicle is also being adapted to leverage data connectivity in combination with voice channel connectivity in what is referred to as the "connected car" concept.

The "connected car" concept has continued to evolve over the past few years and commercial launches of rather sophisticated vehicle services are becoming a reality. These services often rely on vehicle location and "on cloud computing," defined as web services accessed over a data channel. Examples of these services include off-board routing, destination capture, remote-vehicle diagnostics, music downloads, traffic reporting, local searches, access to concierge services, connecting to a vehicle dealer, and roadside assistance. The term "off-board" as used herein refers to a location away from and outside the vehicle. The term "local search" as used herein refers to a point-of-interest (POI) search based on proximity to a specific location. The examples given above are regarded as being vehicle-centric in nature and many invoke some form of vocal communication with a live agent or an off-board interactive automation system.

Recently, a trend has emerged whereby motorists operate personal devices while in a vehicle, such as mobile devices, in a way that makes it unsafe while driving. Built-in user interfaces are now being added to the inside of vehicles to provide these mobile functionalities as a component of the vehicle itself. However, a number of concerns about the safety and practicality of these built-in components still exist. It is difficult to enable personal device functionality in a vehicle in a way that makes it safe while driving. The user interfaces are not at all practical for a vehicle driver to use while driving. Not only are the screens of the devices rather small, but, more significantly, the primary input modalities to operate and use a typical mobile device include some form of typing or mechanical interaction by the user with the device. Driver distraction can occur when a driver's cognitive processing is allocated to any task that is not focused on driving a vehicle safely. Making phone calls and entering data into mobile devices are examples of tasks that can be highly distractive while driving. Conventional typing while driving is extremely dangerous because both vision and touch are involved, making it impractical to drive safely. For example, while driving a car, it does not make sense to type a message by twisting and nudging a knob until each target letter is highlighted, followed by a push of the knob ("knobbing"). However, even though it is a very awkward experience, there are cases for which "knobbing" is the only way to enter a destination into a vehicle navigation system. To reduce safety problems, some existing built-in systems attempt to purposefully limit the use of the interface only when the vehicle is stationary. Unfortunately, this stationary requirement adversely compromises the range of capabilities that may be possible with in-vehicle systems.

Accordingly, it would be beneficial to use effective speech interfaces that limit, or completely eliminate, the need for the motorist to use his or her hands to operate the interface. In addition to navigation and dialing of telephone numbers, other applications such as browsing and texting could also benefit from using speech-enabled typing. Thus, speech recognition can play a critical role in enabling personal device functionality inside a vehicle. As a result, effective multi-modal interfaces are needed that are simple and safe to use under driving conditions.

Still, implementing speech-enabled functionalities in an environment inside a vehicle presents a unique and difficult challenge. For example, the microphone must be hands free and therefore, may be at a distance from the speaker's mouth. Also, road noise can be harsh and non-stationary. Furthermore, there may be multiple people inside of the vehicle who are also talking, thereby making it difficult for the system to decipher the speech of one person among several different voices. Because the vehicle presents such a difficult speech recognition environment, a considerable amount of speech recognition optimization is required to achieve reasonable speech recognition performance.

A need exists to overcome the problems with the prior art as discussed above. In essence, what is needed is a speech recognition engine that is capable of complex speech tasks in a harsh environment. In addition, it would be beneficial to provide a practical system and method for an enterprise to design its speech-enabled applications, host the applications, and maintain the applications without the need for in-house expertise to support advanced speech recognition.

Furthermore, effective multi-modal interfaces are needed that are simple and safe to use under driving conditions. Unless effective speech interfaces are available, enabling personal device functionality in the vehicle will not be safe while driving. Accordingly, it would be beneficial to provide a human-to-machine, in-vehicle interface that enables safely completing a text input task while driving a vehicle.

SUMMARY OF THE INVENTION

The present invention provides safe measures for completing tasks that involve typing under driving conditions. Safety is maintained because the interface is designed to be extremely simple and quick to use. Simplicity to the driver is achieved by leveraging speech and hearing as primary input/output modalities during interactions within the vehicle while, at the same time, minimizing the need for visual and mechanical interactions that relate to completing tasks. Accordingly, in the present invention, an advanced human-like speech recognition system as described above is used to enable the process of typing short text strings.

More particularly, the present invention pertains to a method of prompting that begins with the speaking task and follows with a computerized verbalization of the text. Subsequent user interface steps can be visual in nature, or only involve sound. In terms of the use case, the vehicle driver hears audio prompts and responds with speech to complete a task such as creating a text message. As a result, the present invention makes it practical for vehicle drivers to use their speech to enter text strings. By leveraging an on-premise speech-recognition solution that connects to a remote (or hosted) speech recognition system, referred to as "SOA," an asynchronous approach can be used to recognize speech. The dialogue is always forward moving and the user is not asked to repeat utterances, even though the user can ask to repeat a phrase, if the application includes an appropriate query. The benefits of such an approach provide a safe and enjoyable user interface that is compelling to use while driving a vehicle.

Embodiments of the present invention provide a method for implementing an interactive automated system, comprising processing spoken utterances of a person using a processing system located in proximity to the person, transmitting the processed speech information to a remote data center using a wireless link, analyzing the transmitted processed speech information to scale and end-point the speech utterance, converting the analyzed speech information into packet data format, selecting at least one optimal specialized speech recognition engine to translate the converted speech information into text format, transporting the packet speech information to the at least one selected specialized speech recognition engine using an internet-protocol transport network, retrieving the recognition results and an associated confidence score from the at least one specialized speech recognition engine, continuing the automated dialog with the person if the confidence score meets or exceeds a pre-determined threshold for the best match, and selecting at least one alternative specialized speech recognition engine to translate the converted speech information into text format if the confidence score is low such that it is below a pre-determined threshold for the best match.

In accordance with another feature, an embodiment of the present invention includes wherein the at least one alternative specialized speech recognition engine is agent-assisted.

In accordance with another feature, an embodiment of the present invention includes wherein the at least one selected optimal specialized speech recognition engine is not local.

In accordance with another feature, an embodiment of the present invention includes wherein the at least one selected optimal specialized speech engine is selected based on a given intent of the person.

In accordance with yet another feature of the present invention, the automated dialog is continued with the person prior to, or subsequent to, receiving the recognition results in an asynchronous manner.

In accordance with yet another feature of the present invention, the automated dialog is continued with the person subsequent to receiving the recognition results in a synchronous manner.

In accordance with yet another feature, an embodiment of the present invention further includes logging the packet data and recognition results for subsequent analysis.

In accordance with yet another feature of the present invention, the processing system is located on-board a vehicle.

In accordance with yet another feature of the present invention, the vehicle location information is also transported with the packet speech information to the at least one selected specialized speech recognition engine.

In accordance with yet another feature, an embodiment of the present invention further includes logging the vehicle location information for subsequent analysis.

In accordance with yet another feature of the present invention, the intent of the person includes at least one of texting, browsing, navigation, and social networking.

Embodiments of the present invention also provide an interactive automated speech recognition system comprising a processing system located in proximity to a person wherein the processing system processes spoken utterances of the person, a remote data center, a wireless link that transmits the processed speech information from the processing system to the remote data center wherein the transmitted processed speech information is analyzed to scale and end-point the speech utterance and converted into packet data format, at least one optimal specialized speech recognition engine selected to translate the converted speech information into text format, an internet protocol transport network that transports the converted speech information to the at least one selected optimal specialized speech recognition engine, and wherein the at least one specialized speech recognition engine produces recognition results and an associated confidence score, and based upon the confidence score, the automated dialog is continued with the person if the confidence score meets or exceeds a pre-determined threshold for the best match, or at least one alternative specialized speech recognition engine is selected to translate the converted speech information into text format if the confidence score is low such that it is below a pre-determined threshold for the best match.

Additional advantages of the present invention will be set forth in the Detailed Description which follows and may be understandable from the Detailed Description or may be learned by practice of exemplary embodiments of the invention. Still other advantages of the invention may be realized by any of the instrumentalities, methods, or combinations particularly pointed out in the claims. Although the invention is illustrated and described herein as embodied in one or more exemplary embodiments, it is, nevertheless, not intended to be limited to the details shown because various modifications and structural changes may be made therein without departing from the spirit of the invention and within the scope and range of equivalents of the claims. The system and method of operation of the invention, however, together with additional objects and advantages thereof, will be best understood from the following description of specific embodiments when read in connection with the accompanying drawings.

BRIEF DESCRIPTION OF THE DRAWINGS

The accompanying figures, where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION OF THE INVENTION

Figure 1:
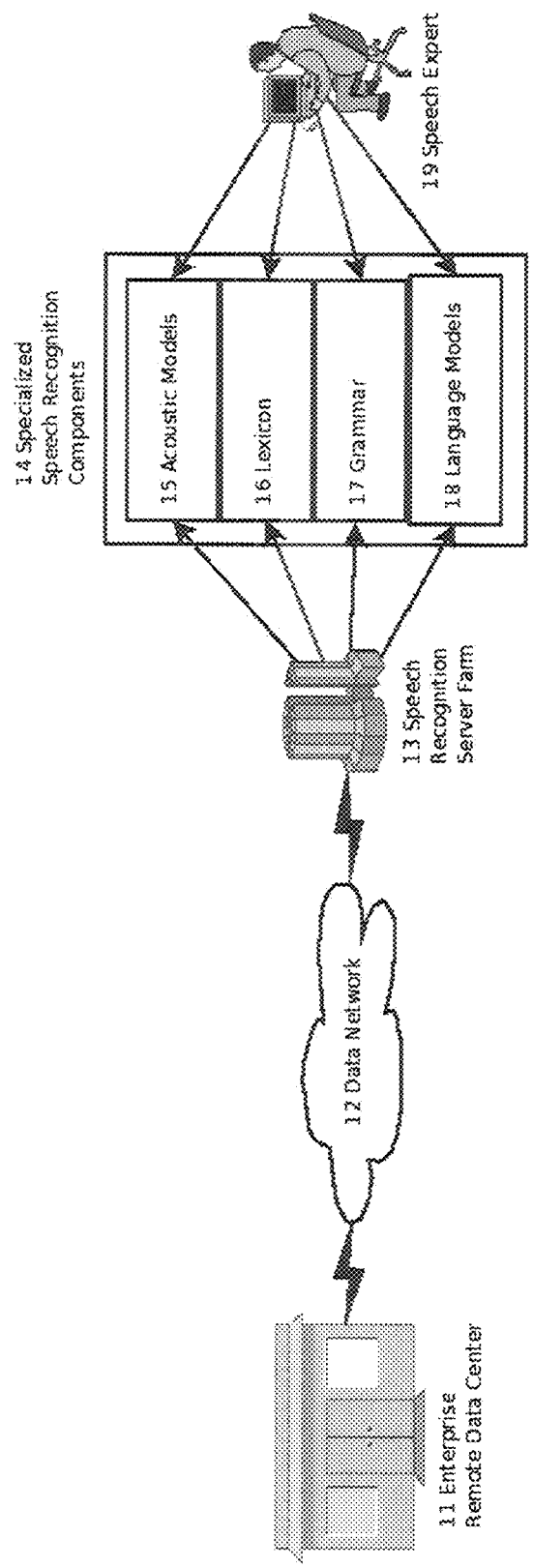
FIG. 1 is a system architecture diagram illustrating components of a speech recognizer according to an exemplary embodiment of the present invention.

Although the present invention is illustrated and described herein as embodied in a system of and method for providing service oriented speech recognition for automated interaction and in-vehicle user interfaces requiring minimal cognitive driver processing, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

Before the present invention is disclosed and described, it is to be understood that the terminology used herein is for the purpose of describing particular embodiments only and is not intended to be limiting. The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language).

As used herein, the term "about" or "approximately" applies to all numeric values, whether or not explicitly indicated. These terms generally refer to a range of numbers that one of skill in the art would consider equivalent to the recited values (i.e. having the same function or result). In many instances these terms may include numbers that are rounded to the nearest significant figure. The terms "program," "software," "software application," and the like as used herein, are defined as a sequence of instructions designed for execution on a computer system. A "program," "software," "computer program," or "software application" may include a subroutine, a function, a procedure, an object method, an object implementation, an executable application, an applet, a servlet, a source code, an object code, a shared library/dynamic load library, and/or other sequence of instructions designed for execution on a computer system.

Referring now to FIG. 1 of the drawings in detail, there is shown a system architecture diagram representing the basic components of a speech recognizer in connection with a remote data center that require special optimization under conditions in which the environment is harsh and the recognition task is complex (e.g., recognition of dictation or a street address). Even when a speech recognizer is highly tuned, accuracy can be unpredictable simply because it is virtually impossible to model every sound that a person can make when speaking into a microphone. However, when the user is cooperative and possesses some experience in using the system, acceptable results can be achieved.

Generally speaking, there are a number of complicated components to any automatic speech recognition engine that include acoustic models, grammars, dictionaries, and language models. In simple terms, "acoustic models" represent how speech sounds in a target environment, "grammars" represent what can be recognized during an application, "dictionaries" represent the way that words are to be pronounced, and "language models" govern the allowable sentence structure. In what follows, a brief review of selected components of a speech recognition engine is made to gain an appreciation of the speech technology required by the invention as it is disclosed here forth. A detailed discussion of the fundamental components of spoken language processing and speech recognition systems is found in "Spoken Language Processing: A Guide to Theory, Algorithm and System Development," by Xuedong Huang, et al., May 5, 2001, the contents of which are fully incorporated herein by reference as though fully set forth.

In detail, "acoustic models" 15 are statistical representations of phonetic sounds that are produced under specific environmental conditions. Phonetic sounds can be thought of as sub-units of spoken words that are to be recognized by an automated speech recognition (ASR) system. The environmental conditions are characterized by numerous components, including the microphone type and its placement, the surrounding acoustic media, audio transmission properties, background noise, signal conditioning software, and any other variable that influences the quality of the sound that the speech recognizer processes. Acoustic models 15 are needed for high accuracy speech recognition, and, the more highly tuned the acoustic model, the more accurate is the speech recognition. Speech data collections form the basis of acoustic models. However, live adaptation is used for in-the-field tuning. Thousands of recordings that represent environmental extremes of a target recognition environment constitute a "good" base of speech data.

"Grammar" or "Grammars" 17 are a set of rules that define the set of words and phrases (i.e., a vocabulary) that may be recognized during voice applications. An application may have several grammars such as "yes/no," numerical digits, street names, action menu items, etc. To maximize accuracy, only the necessary vocabulary should be active at any point of an application call flow. For example, numerical digits would not be a part of the active vocabulary for recognition during a "yes/no" query unless there is a special reason, as there is a risk, for example, that the sound "oh" for the number zero may be confused with the sound of the word "no." It is important to take into consideration that grammars containing too many short words are more prone to exhibiting low accuracy because short words are more difficult to recognize than long, multi-syllabic words. In general, the longer the word, the more phonetic content there is available for distinguishing it from other words. For purposes of speech recognition, a difficult vocabulary is the alphabet in which there are short sounds that, in many instances, rhyme with or sound familiar with one another.

Grammars 17 rely on "dictionaries" for pronunciation information. Dictionaries are commonly referred to as "lexicons." A "lexicon" 16 is a collection of words and their associated pronunciations in terms of phonetic transcriptions. Similar to a common dictionary, pronunciation is specified by a standard symbol set.

"Language models" 18 are designed to assist the recognition matching process for multiple words in a phrase or a sentence. Common languages are statistical in nature and attempt to assign a probability to a sequence of allowable words by means of a probability distribution. Language modeling can be used in many natural language processing applications such as speech recognition, machine translation, part-of-speech tagging, parsing, and information retrieval. In speech recognition, to predict the next word in a speech sequence, a language model can be used to capture the properties of a language.

In summary, for any given speech recognition technology, acoustic models 15, grammars 17, lexicons 16, and language models 18 are optimized to reach a high level of accuracy. Ideally, if a human can understand a command or a structured utterance, then a properly tuned speech recognizer should be able to recognize it too. Accordingly, using real-world recordings for adaptation purposes is one way to improve accuracy.

A key feature of the present invention lies in a particular division of duties—the performance of the complex speech recognition tasks are separated from the system that is hosting the application. The base speech application contains a dialog structure that relies on its own recognizer for basic command and control. For complex speech recognition tasks, accessible specialized recognizers can be used.

From a system perspective, latency, as perceived by the user, must be low to avoid user frustration. That is, the recognition system must respond quickly to spoken utterances. When an application connects to specialized speech recognizers through an Internet data connection, the connection time is extremely fast, thereby yielding a reasonable amount of time between the end of a spoken utterance and the resulting action by the application (e.g., a subsequent prompt or a vehicle display change). The time to convert a wave file (i.e., a waveform audio file that can be compressed to minimize data size) into a packeted data format for Internet transmission is negligible. However, if a voice channel is used to pipe audio wave files to a remote recognizer, the connect time may prevent a good user experience from being possible as a typical telephone connection time is approximately 10 seconds. Speech recognition that is server-based leverages the remote device's Internet connection to transmit packeted audio and to have returned recognition results almost instantaneously. The remote device acts as the client and the recognition is performed off-board by way of a data channel.

The present invention is unique as it viably mixes recognition engines in real-time with a real-time dialog with humans. The present invention deals with an enterprise automated system having its own speech recognition resources and an actual dialog occurs (i.e., audio prompting occurs). The Internet is not accessed wirelessly—a telephone voice channel serves as the means of communication between the person, or motorist, and the enterprise automated system. The present invention provides an automatic interactive system at an enterprise remote data center (ERDC) that leverages multiple specialized speech recognizers over a data channel (i.e., the Internet) and allows, by way of a wireless voice communication channel, a person, such as a motorist, to interact in a hands-free environment with the automated system, the automated system being capable of understanding complex speech requests. The primary advantages of hosting the application on-premise at the ERDC include ease of back-end integration, control of application design and support, improvement of application maintenance, and cost-effective implementation due to server sharing. Because the platform is off-board, the application dialog design can easily be modified without changing any remote, or in-vehicle, hardware or software.

As a result, the enterprise remote data center (ERDC) can prototype and launch automated interactive applications that are designed internally. This means that complete application ownership is possible even though sophisticated speech recognition is used within the application and candidate speech recognition engines can be evaluated without making application changes. Also, multiple-language speech recognition is easily accommodated through the use of specialized speech recognition services.

In terms of cost, the ability to share internal server-based speech recognition resources and the web-accessed server-based speech recognition resources across a large spectrum of different vehicles is beneficial. For example, each channel of a server-based, interactive, automation system could accommodate numerous vehicles simultaneously.

Locating an automated interactive automation service cluster within the ERDC provides substantial benefits over an embedded speech system inside a vehicle. For example, this architecture provides increased operational flexibility and control from the call center. Efficiency is increased because content can be added or modified with centralized hardware and/or software. Calls from the vehicles can be monitored and improvements can be made at the centralized locations, rather than inside each vehicle. Also, there is an improved scalability as computer resources can be shared across a large number of vehicles. To supplement these benefits provided by the invention, another advantage arises because a "thin" client can be located in the vehicle using standard telematics control units (TCUs), rather than a specialized on-board computer.

Furthermore, the inventive system provides the ability to manage personalization in terms of customer preferences.

The present invention is directed to a system and method that leverages multiple specialized speech recognizers that are accessed on-premise through an Internet-protocol transport network. The ERDS is equipped with highly available connectivity for high-speed Internet access, thereby eliminating wireless coverage from being an issue. The speech application is hosted on an automated interactive system located within the ERDC (or call center). All application maintenance and updating can be managed by the enterprise remote data center (ERDC) without the need of costly subject-matter experts in speech recognition. For purposes of providing an illustrative non-limiting example, this particular embodiment is shown as being used in connection with motor vehicles in FIG. 2. However, the system and method of the present invention is applicable to all interactive systems.

Figure 2:
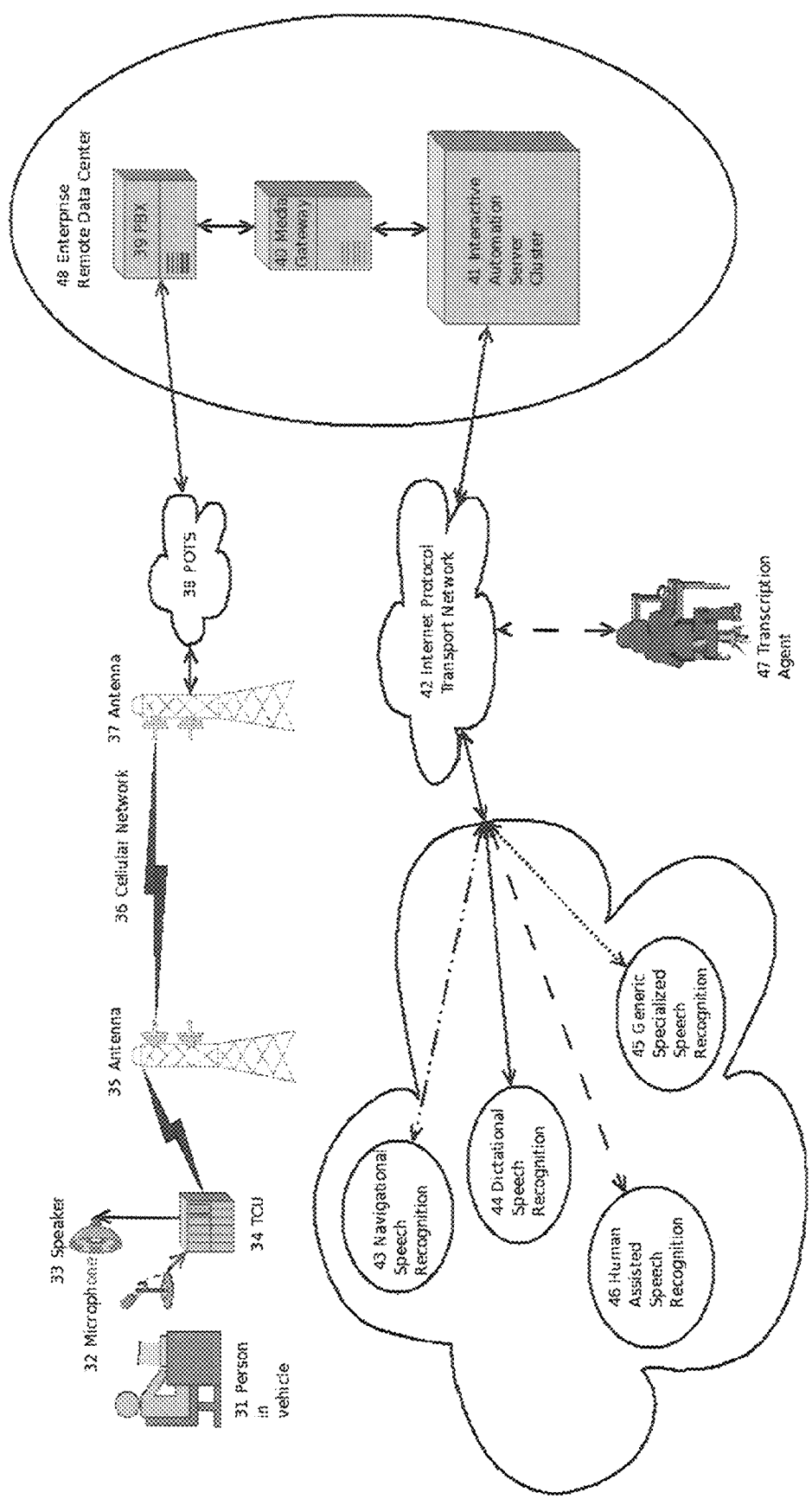
FIG. 2 is a system architecture diagram illustrating components of a service-oriented architecture for in-vehicle speech recognition according to an exemplary embodiment of the present invention.

Referring to FIG. 2, in one exemplary embodiment, after the motorist or vehicle driver 31 initiates a telematics connection, the vehicle's telematics control unit (TCU) 34 connects to the ERDC 48 by way of a wireless communications link that includes antennas 35, 37 and the cellular network 36. The final stage of the telematics connection includes the telephone network (e.g., POTS) 38, which terminates at the PBX 39 within the ERDC 48. In this exemplary embodiment, the ERDC 48 is comprised of a media gateway 40 and an interactive automation service cluster 41. The media gateway 40 manages the communications media session between the PBX 39 and the interactive automation service cluster 41. The interactive automation service cluster 41 is the central point of intelligence of the present invention as described in the following text.

A telematics request can be accomplished by, for example, the vehicle driver 31 pressing a button, in response to which the TCU 38 initiates a connection with the ERDC 48 as described above. After the connection is established, the vehicle driver 31 is able to hear audio prompts through, for example, the in-vehicle speaker 33 located in proximity to the vehicle driver 31. Through the in-vehicle speaker 33 and a microphone 32, an automated interaction takes place with the vehicle driver 31. The interaction could begin, for example, with the audio prompt "How may I help you?" Simultaneously and in a seamless fashion, when the telematics connection is established to the ERDC 48, data information such as the vehicle's location, vehicle model information, vehicle driver information, diagnostic information, etc. can be captured and communicated via a data channel to the interactive automation service cluster 41.

In response to the initial audio prompt (e.g., "How may I help you?"), the vehicle driver may then respond out loud with a request and say, for example, "I need to find an Italian restaurant nearby" or "I want to text my friend Bob." Depending on the type of request made by the vehicle driver 31, the interactive automation server cluster 41, which is comprised of a group of servers interconnected together to form the ERDC-located speech system, automatically selects the appropriate speech recognition engine. The appropriate speech recognition engine could be located internal to the interactive automation server cluster 41 within the ERDC 48 or could be externally available to the interactive automation server cluster in a speech recognition service cloud 49 that may be accessed through the world-wide-web (referred to as "cloud computing") from one or more speech vendors that offer a URL access point to their speech server farm. The speech engine that is selected depends on the type of request made by the vehicle driver 31. For example, simple "yes/no" queries or action menu selections may be handled by the recognition engine hosted within the interactive automation server cluster 41. More complex speech recognition tasks, such as recognizing a spoken sentence, could be handled by a remote dictation engine 44. The Internet protocol transport network 42 is highly available to the interactive automation server cluster 41 and operates at a high speed, making it practical to recognize complex speech utterances in just a matter of seconds from the time the vehicle driver utters the directive.

When handling a complex speech recognition task, such as recognizing a navigational destination, a remote navigational engine 43 by way of the Internet protocol transport network 42 can perform the handling. The speech application is executed within the interactive automation server cluster 41 and waits for a response from the remote navigational engine 43 before proceeding with the next step (e.g., a subsequent prompt, visual display of the destination information, or an end to the interactive session).

For each spoken utterance, a recognition process occurs and, as part of the process, the recognizer creates an "n"-best list of the top hypotheses, or "recognition results." In other words, if "n" equals five, the recognizer generates up to five text representations of what was possibly spoken, each with an associated probability of correct recognition. The variable "n" may be a pre-defined, limited number and/or is dependent upon the number of results returned that meet or exceed a certain probability of correct recognition. Each recognition hypothesis is assigned a confidence score (or probability) that is typically normalized to 1. If the top choice is assigned a confidence score above a specified threshold (e.g., 0.85), the spoken input is considered to be a final recognition result without requiring further processing.

It may be that the result provided by the remote navigational engine 43 is of low confidence, meaning that the spoken speech was not automatically recognized with a certain level of confidence. To perform the recognition in such an instance, the corresponding audio wave file could be passed over the web to a live transcription agent 47. Should this situation occur, the speech application, executed within the interactive automation server cluster 41, waits for a response from the transcription agent 47 before proceeding to the next step (e.g., a subsequent prompt, a visual display of the destination information, or an end to the interactive session).

By accessing the speech recognition service cloud 49 in real time, the user experience is much improved over the prior art. The interactive automation server cluster 41 serves as the intelligence behind the automation experienced by the vehicle driver, or other users. The fact that the system and method is agnostic (i.e., not tied to one particular technology vendor) in choosing the speech recognition engine makes the system and method highly robust and flexible because multiple best-in-class recognizers can be leveraged. In addition, because the system and method of the present invention incorporates agent assistance into the implementation model, the user experience can also "feel" human in the wake of noise and heavy accent characteristics. Finally, the vehicle driver or other user 31 can be connected to a live agent (not shown) to handle extreme circumstances. Such a connection is easily managed by the interactive automation server cluster 41 if the application is configured accordingly.

In conjunction with the system and method of the speech recognition solution that is described above, the present invention also provides a user interface that enables functionality in a vehicle in a way that makes it safe while driving. The user interface of the present invention allows navigation, dialing, web browsing, text messaging (texting), and other applications for mobile devices by speech-enabled typing.

Generally, the primary objective of the user interface is to make it practical for a vehicle driver to access a set of applications that are controlled and managed by user interfaces that share a strong degree of commonality. For example, the user interface for texting shares commonality with the user interface for web browsing. Likewise, the user interface for web browsing shares commonality with the user interface for local search and full address entry for navigation. By design, there is virtually no learning required by the vehicle driver. The invention utilizes a three-step approach for completing tasks that normally require conventional typing. The three steps are: intent initiation; speaking a phrase; and managing the result. No typing is required.

In use, the vehicle driver initiates the task by indicating intent. Intent can be communicated through a specific button push, touching a specific icon, or saying a specific speech command such as "I want to send a text message." Once the user indicates intent, the user is prompted by speech to say a phrase that will match the intended text for a text message or the intended text to enter in a search box, or a destination category, name, or address. Most significantly, the invention makes it practical for vehicle drivers to use their own speech to enter text strings. The recognized result is, then, managed by the user in a way that depends on the task. Web browsing would entail a simple glance at a screen. Texting would entail saying the name of the recipient and then speaking the content of the text message. Destination entry could entail touching a screen to download a specific destination to an on-board navigation system. Other examples follow the same pattern: input intent; speak a phrase; and manage the result. As set forth above, the user interface of the present invention requires advanced speech recognition that allows free-form dictation in the highly challenging environment of a vehicle's interior.

It should be noted that the present invention also encompasses asynchronous speech recognition, which means that the user interface can step forward in execution before recognition results are obtained. For example, a user could speak a text message and be prompted to say the name of the recipient before the spoken text message is actually recognized. The user interface can include playing back the later-recognized text message along with the target recipient. Longer latencies associated with obtaining recognition results can be managed by sending the message without confirmation but subsequent to the user interaction within the vehicle. For example, the message may be recognized and sent twenty (20) seconds later, without the user knowing exactly when the message was sent. However, some tasks, such as web browsing or local search, are sensitive to timing, and a synchronous approach is only practical when the latencies are controlled to be within several seconds, analogous to delays typically experienced with conventional web browsing.

The asynchronous speech recognition approach of the invention has advantages that extend beyond the vehicle. For example, a conventional interactive voice response system (IVR) typically includes error handling dialogues that slow down the interactive process and often cause user frustration when recognition failures occur. However, for purely asynchronous speech recognition, the dialogue is always forward moving (i.e. the next-level prompts occur immediately after a user speaks even if the speech isn't recognized) and the user is not asked to repeat spoken utterances. Furthermore, a portion of the dialogue can be synchronous and thereby allow for the system to ask a user to confirm a phrase that was spoken by the user or the user can cause the system to repeat a result by responding to a yes/no query (e.g., answering "no" to the system's query of "did you say . . . ?").

Figure 3:
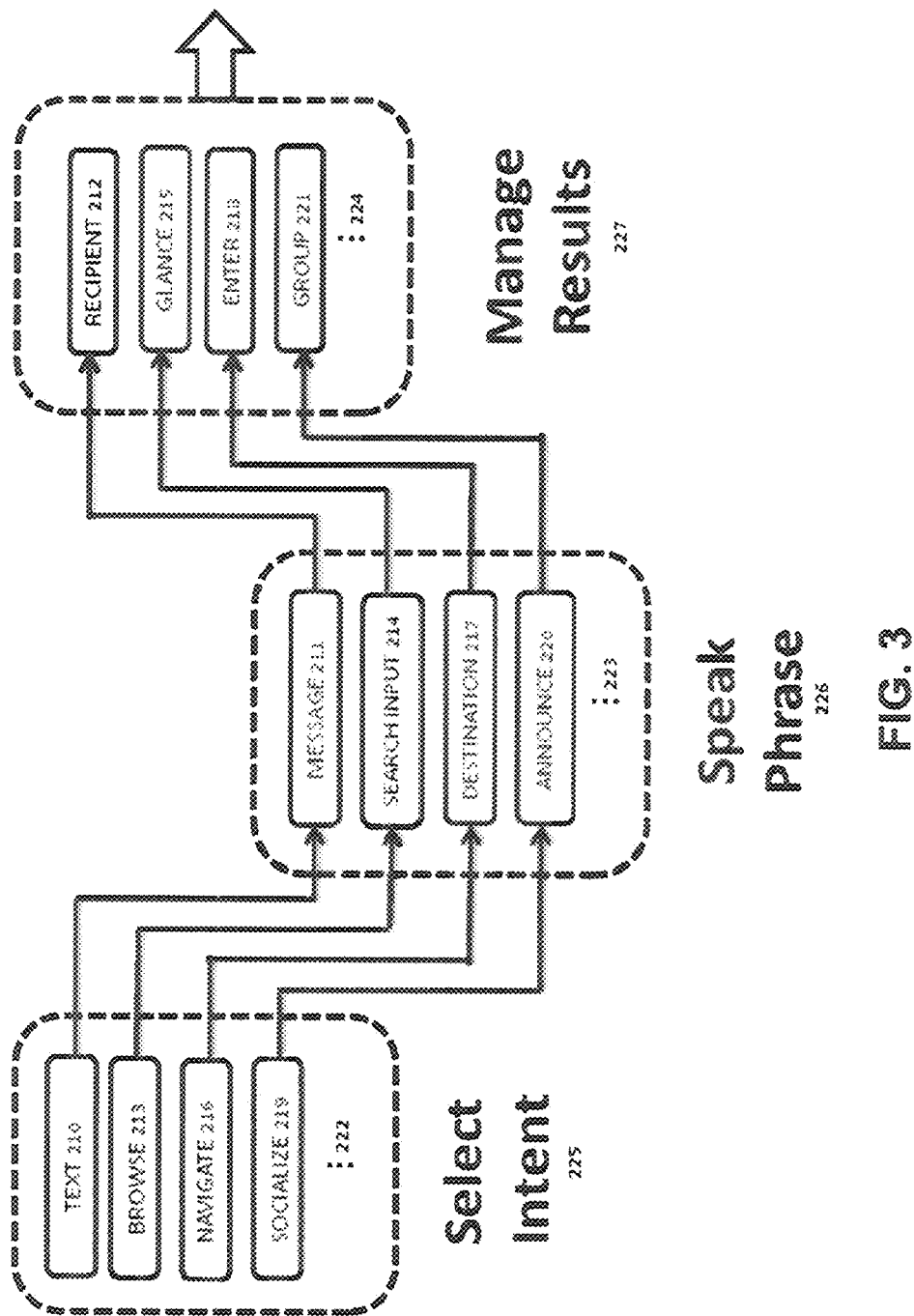
FIG. 3 is a flow diagram illustrating the system of processes that comprise a multi-modal user interface design and how commonalities are shared among a number of exemplary user interfaces according to an exemplary embodiment of the present invention.

According to an exemplary embodiment of the present invention, FIG. 3 shows a representation of the inventive in-vehicle, user-interface solution, based on a system of user interface processes or applications that involve or require the same basic steps albeit accomplishing the steps by different methods and producing different results or providing different functions to the user. The user interface is multi-modal in nature and is based on three steps that are common among a variety of applications including, but not limited to, texting 210, browsing 213, navigation 216, and social networking 219, as well as other applications 222. Step one 225 involves establishment of intent, or selecting the application intended to be used. Application selection may be achieved by touching an icon on a display, pushing a particular button, or by saying a speech command such as "web search" or "text-by-voice." The second step 226 involves speaking the phrase to be converted to text, which can be referred to as speech-enabled typing. The nature of the phrase to be converted to text depends on the user intent. The type(s) of phrases to be converted include, but are not limited to, text messages 211, search string entries 214, target destinations 217, or brief announcements 220, as well as other phrases 223, depending on the intent 225. The recognized phrase is played through audio (text-to-speech, for example) and the user then decides how to manage the result 227. Step three 227, or the management of the result, can entail such actions as saying the name of a target text recipient 212, glancing 215 at search results such as a weather report on a display, touching a displayed destination to enter 218 the destination into a navigation system, or speaking a group 221 name for a social networking communication. It is noted that steps one and three can involve input modalities other than speech, but step two entails speech-enabled typing. A key to the present invention is the simplicity of a single user interface method that can be applied across a variety of different applications. The simplicity of the resultant user interface design is highly appealing under driving conditions because very little cognitive processing is required by a driver to learn and use many applications. Because there are so few steps, task completion is fast and distraction is thereby minimized.

Figure 4:
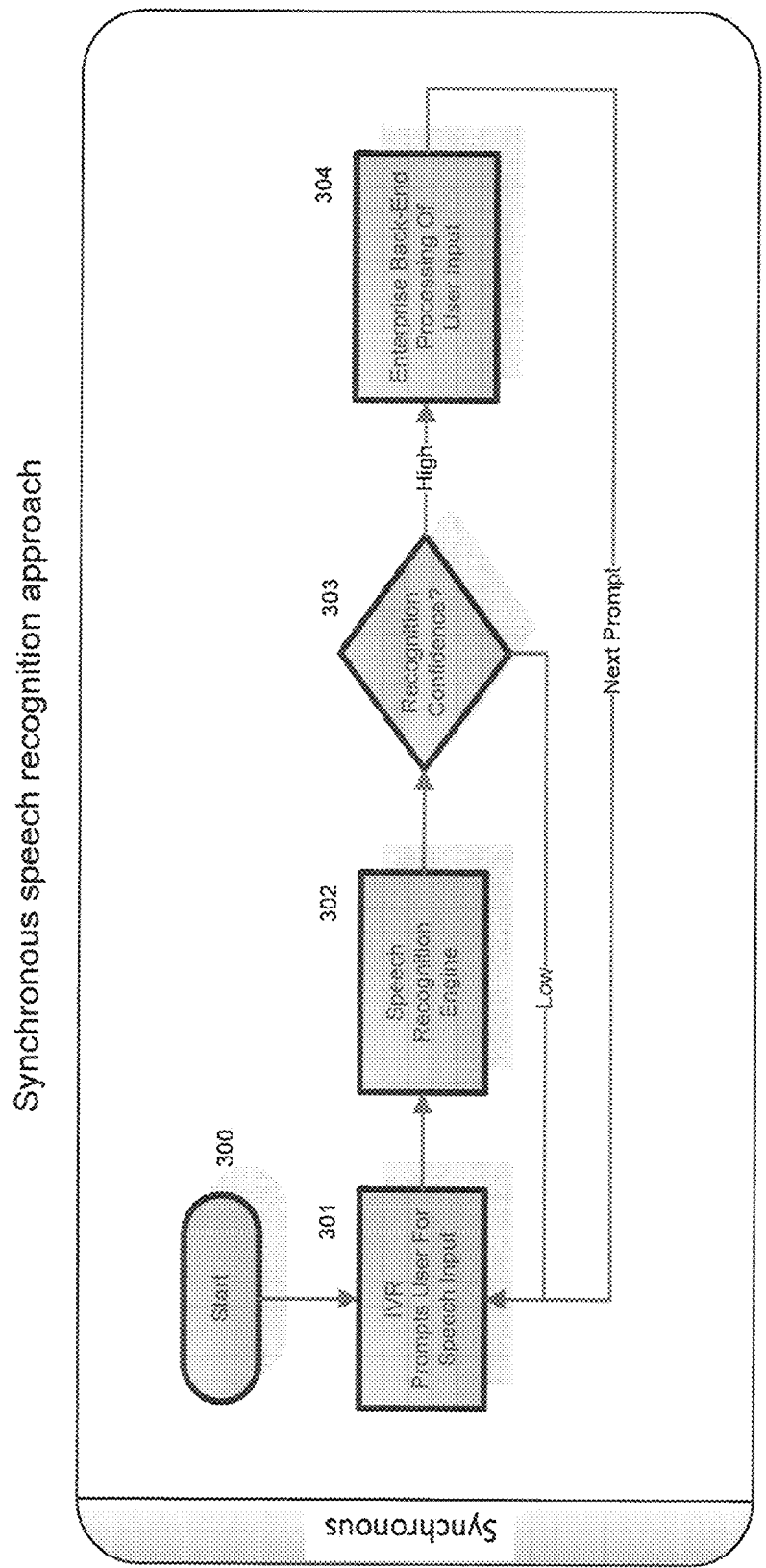
FIG. 4 is a process flow diagram of a synchronous speech recognition approach aimed at showing the limitations of the user experience.

FIG. 4 is a process flow diagram of a synchronous speech recognition approach. The user starts 300 and experiences an IVR prompt 301 and, typically, utters a verbal response. The recognition engine 302 processes the verbal response and, based on matching scores that are referred to as recognition confidence levels 303, either moves on to the next prompt after processing is completed within the enterprise back-end 304, or re-prompts 301. When all of the prompting steps are deemed successful, the interactive process ends. The potential issue with a synchronous approach is that the user can get stuck in an error loop when successive low confidence levels 303-low occur. Those experienced in the science of automatic speech recognition attribute unexpected audio input as a major cause of recognition errors, even though humans can typically understand such unexpected audio input, hence the evolution of human-assisted speech recognition. Thus, synchronous speech recognition solutions often are associated with poor user experiences. For example, a conventional interactive voice response system (IVR) typically includes error handling dialogues that increase the duration of the interactive process and, often, cause user frustration when recognition failures occur.

Figure 5:
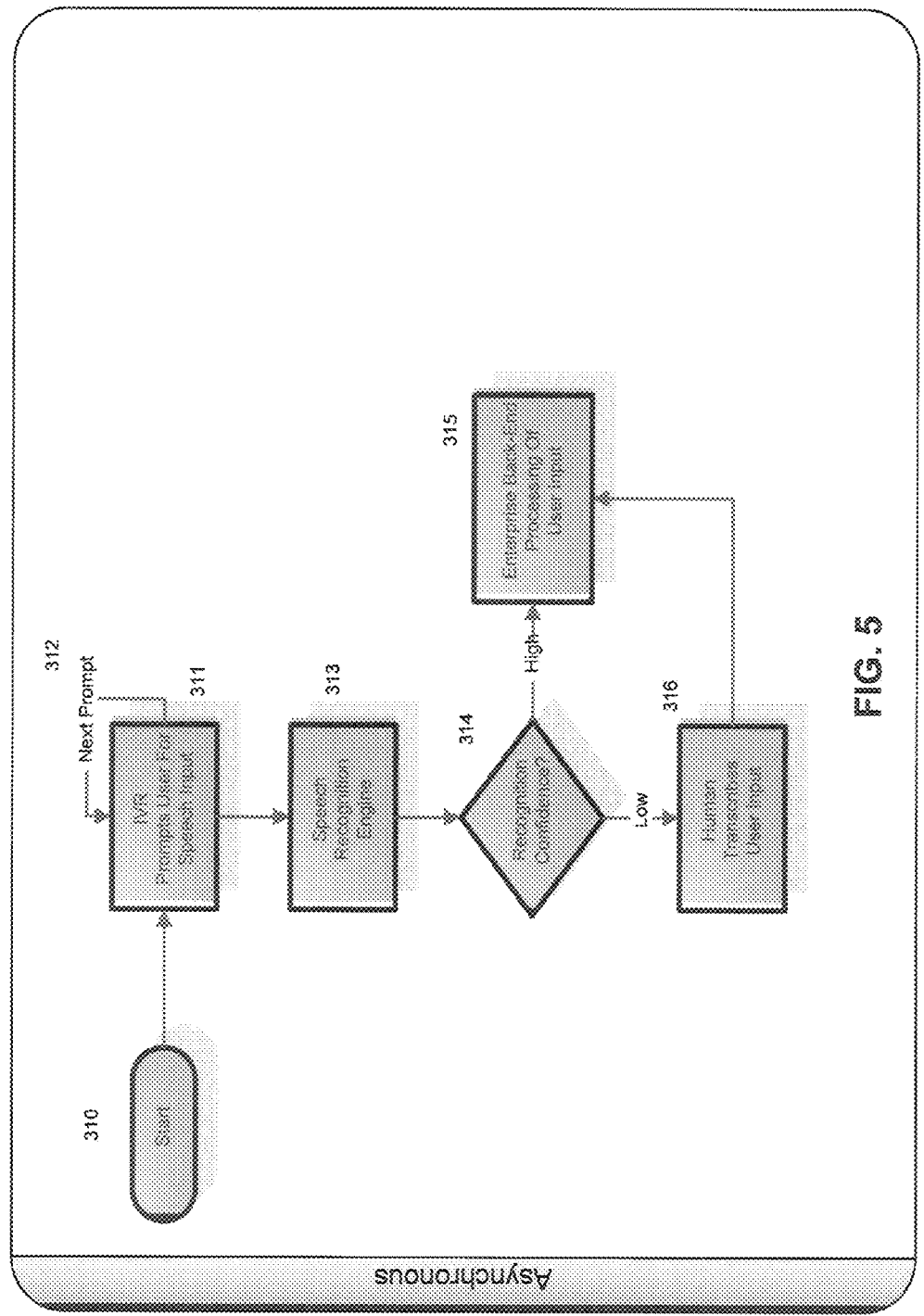
FIG. 5 is a process flow diagram of an asynchronous speech recognition approach aimed at showing the advantages of the asynchronous approach according to an exemplary embodiment of the present invention.

As depicted in FIG. 5, for asynchronous speech recognition, the user starts 310 and experiences an IVR prompt 312. The IVR captures the user utterance, transfers the audio to a speech recognition engine 313 that can be queued, and executes the next prompt 312 (if any remain) in the series. Processing 315 of the user utterances occurs in parallel to the prompting 312 for user input; that is, the two activities are asynchronous. As a result, the user prompting 311 process will not be interrupted due to low recognition confidences scores 314 or excessive recognition latencies. As shown in FIG. 5, low confidence utterances can be transcribed by a human 316 thereby assuring high accuracy, but at a cost that is greater than fully automated speech recognition. For asynchronous speech recognition as performed by the instant invention, prompting is a forward moving process whether a valid recognition result is obtained or not. The potential issue of a user getting stuck in a prompting error loop 312 is eliminated and there is some guarantee of a good user experience. Those experienced in the science of automatic speech recognition attribute unexpected audio input as a major cause of recognition errors. Involving humans within the systems and processes of the invention allow these errors to disappear because those humans can usually still transcribe such "infected" audio. Thus, human-assisted speech recognition employed by the invention is very practical when combined with the asynchronous speech recognition solutions. If the system detects silence on the user side (i.e., no utterance is spoken), then prompting could end early by design, the assumption being that the user is not participating in the automated dialogue. For purely asynchronous speech recognition, the dialogue is always forward moving when the user cooperates, which has a benefit of preventing the user from repeating spoken utterances. It is noted that a portion of the dialogue can be synchronous and a portion can be asynchronous. In fact, for some applications, a portion of the dialogue may be required to be synchronous to, perhaps, allow for a user-requested repetition of a phrase (a scenario in which a user is prompted with "Did you say< >? Please say yes or no.") More importantly, certain prompting may depend on a recognition result thereby implying the need for synchronous speech recognition in a particular circumstance. The approach described here provides a compelling and reliable user interface that is safe to use and reliable, even while driving a vehicle.

The present invention can be purely synchronous, purely asynchronous, or a combination of both. Conventional speech applications utilize prompting schemes within which, for each prompt, prompting is continued after a recognition result is obtained. Certain applications must be implemented with limits on latency between the time an utterance is finished being spoken and the time the recognition result is utilized (such as dialing a phone number by voice); these applications generally require a synchronous approach. However, certain applications can be implemented with less stringent limits on latency between the time an utterance is finished being spoken and the time the recognition result is utilized (for example, a text message can be sent several minutes after a driver has spoken a text message); these applications generally require a synchronous approach, but can tolerate asynchronous speech recognition for part of the dialogue. For example, a driver may request to send a text message (intent); the user is prompted and speaks the text message (which could be recognized asynchronously); the user is prompted and speaks the name of the text message recipient, which is recognized synchronously, or asynchronously; the test message is sent after all recognition results are determined. Some applications such, as form filling, can be completely asynchronous. Form-filling applications can include, for example, capturing a user name, address, credit card number, and service selection; the form can be filled out with text after the recognition results are determined, perhaps hours after the user dialogue is complete. As a further example, part of a form-filling dialogue can include having a user describe something like an automobile accident; and application simply records it for subsequent recognition, possible though human assisted speech recognition.

Although specific embodiments of the invention have been disclosed, those having ordinary skill in the art will understand that changes can be made to the embodiments without departing from the spirit and scope of the invention. The scope of the invention is not to be restricted, therefore, to the embodiments described, and it is intended that the appended claims cover any and all such applications, modifications, and embodiments within the scope of the present invention. The service oriented speech recognition systems and methods and the in-vehicle user interface and processes that minimize driver cognition described according to the present invention have been applied to a vehicle example. The above-described embodiments, however, should be regarded as illustrative rather than restrictive. The invention should not be construed as being limited to these particular embodiments discussed above. Additional variations of the embodiments discussed above will be appreciated by those skilled in the art as well as for applications, unrelated to vehicles, which require minimizing driver cognitive actions.

What is claimed is:

1. A method for implementing an interactive automated system, comprising:

using a telematics processing system located in proximity to a person, receiving in a first interaction an indication of intent from the person and, thereafter, in a second interaction that is separate from the first interaction, receiving from the person a spoken utterance associated with the indicated intent, wherein the spoken utterance associated with the indicated intent matches intended text of a type of intent available to the person;

processing the spoken utterance of the second interaction using the processing system;

transmitting the processed speech information to a remote data center using a wireless link;

analyzing the transmitted processed speech information to scale and end-point the speech utterance;

based upon the indicated intent, selecting at least one optimal speech recognition engine from a set of speech recognition engines;

converting the analyzed speech information into packet data format;

using an internet-protocol transport network, transporting the packet speech information to the selected at least one optimal speech recognition engine for translation of the converted speech information into text format;

retrieving recognition results and an associated confidence score from the selected at least one optimal speech recognition engine;

continuing an automated dialog with the person if the confidence score meets or exceeds a predetermined threshold for the best match; and selecting at least one alternative speech recognition engine to translate the converted speech information into text format if the confidence score is low such that it is below a predetermined threshold for the best match.

2. The method of claim 1, wherein the at least one alternative speech recognition engine is agent-assisted.

3. The method of claim 1, wherein the selected at least one optimal speech recognition engine is not local.

4. The method of claim 1, wherein the automated dialog is continued with the person prior to, or subsequent to, receiving the recognition results in an asynchronous manner.

5. The method of claim 1, wherein the automated dialog is continued with the person subsequent to receiving the recognition results in a synchronous manner.

6. The method of claim 1, further comprising logging the packet data and recognition results for subsequent analysis.

7. The method of claim 1, wherein the processing system is located on-board a vehicle.

8. The method of claim 7, wherein vehicle location information is also transported with the packet speech information to the selected at least one optimal speech recognition engine.

9. The method of claim 8, further comprising logging the vehicle location information for subsequent analysis.

10. The method of claim 1, wherein the intent includes at least one of:
    texting;
    browsing;
    navigation; and
    social networking.

11. The method of claim 1, wherein the indication of intent is non-verbal.

12. A method for implementing an interactive automated system, comprising:
    using a telematics processing system located on-board a vehicle, receiving in a first interaction an indication of intent from a vehicle driver and, thereafter, in a second interaction that is separate from the first interaction, receiving from the vehicle driver a spoken utterance associated with the indicated intent wherein the spoken utterance associated with the indicated intent matches intended text of a type of intent available to the vehicle driver;
    processing the spoken utterance of the second interaction using the processing system;
    transmitting the processed speech information to a remote data center using a wireless link;
    analyzing the transmitted processed speech information to scale and end-point the speech utterance;
    based upon the indicated intent, selecting at least one optimal speech recognition engine from a set of speech recognition engines;
    converting the analyzed speech information into packet data format;
    using an internet-protocol transport network, transporting the packet speech information and vehicle location information to the selected at least one optimal speech recognition for translation of the converted speech information into text format;
    retrieving recognition results and an associated confidence score from the selected at least one optimal speech recognition engine;
    continuing an automated dialog with the vehicle driver if the confidence score meets or exceeds a pre-determined threshold for the best match; and
    selecting at least one alternative speech recognition engine that is agent-assisted to translate the converted speech information into text format if the confidence score is low such that it is below a pre-determined threshold for the best match.

13. The method of claim 12, wherein the selected at least one optimal speech recognition engine is not local.

14. The method of claim 12, wherein the automated dialog is continued with the vehicle driver prior to, or subsequent to, receiving the recognition results in an asynchronous manner.

15. The method of claim 12, wherein the automated dialog is continued with the vehicle driver subsequent to receiving the recognition results in a synchronous manner.

16. The method of claim 12, wherein the intent includes at least one of:
    texting;
    browsing;
    navigation; and
    social networking.

17. The method of claim 12, further comprising logging the packet data, recognition results, and vehicle location information for subsequent analysis.

18. The method of claim 12, wherein the indication of intent is non-verbal.

19. An interactive automated speech recognition system, comprising:
    a telematics processing system located in proximity to a person;
    a remote data center;
    a wireless link that transmits processed speech information from the processing system to the remote data center, wherein the processing system:
        receives in a first interaction an indication of intent from the person and, thereafter, in a second interaction that is separate from the first interaction, receives from the person a spoken utterance associated with the indicated intent wherein the spoken utterance associated with the indicated intent matches intended text of a type of intent available to the person; and
        processes the spoken utterance of the second interaction and transmits the processed speech information to the remote data center using the wireless link, wherein the transmitted processed speech information is analyzed to scale and end-point the speech utterance and is converted into packet data format;
    at least one optimal speech recognition engine selected to translate the converted speech information into text format, the at least one optimal speech recognition engine being selected from a set of speech recognition engines based upon the indicated intent;
    an internet protocol transport network that transports the converted speech information to the selected at least one optimal speech recognition engine; and
    wherein the at least one optimal speech recognition engine produces recognition results and an associated confidence score and, based upon the confidence score:
        an automated dialog is continued with the person if the confidence score meets or exceeds a pre-determined threshold for the best match; or
        at least one alternative speech recognition engine is selected to translate the converted speech information into text format if the confidence score is low such that it is below a pre-determined threshold for the best match.

20. The system of claim 19, wherein the at least one alternative speech recognition engine is agent-assisted.

21. The system of claim 19, wherein the selected at least one optimal speech recognition engine is not local.

22. The system of claim 19, wherein the automated dialog is continued with the person prior to, or subsequent to, receiving the recognition results in an asynchronous manner.

23. The system of claim 19, wherein the automated dialog is continued with the person subsequent to receiving the recognition results in a synchronous manner.

24. The system of claim 19, wherein the packet data and recognition results are logged for subsequent analysis.

25. The system of claim 19, wherein the processing system is located on-board a vehicle.

26. The system of claim 25, wherein vehicle location information is also transported with the packet speech information to the selected at least one optimal speech recognition engine.

27. The system of claim 26, wherein the vehicle location information is logged for subsequent analysis.

28. The system of claim 19, wherein the intent includes at least one of:
   texting;
   browsing;
   navigation; and
   social networking.

29. The system of claim 19, wherein the indication of intent is non-verbal.

\* \* \* \* \*